United States Patent [19]

Granzow

[11] 4,228,063
[45] Oct. 14, 1980

[54] FLAME-RETARDANT, POLYPHENYLENE-ETHER RESIN COMPOSITIONS CONTAINING A 2,5,5-TRISUBSTITUTED 1,3,2-DIOXAPHOSPHORINANE-2-OXIDE

[75] Inventor: Albrecht H. Granzow, Somerset, N.J.

[73] Assignee: American Cyanamid Company, Stamford, Conn.

[21] Appl. No.: 42,490

[22] Filed: May 25, 1979

[51] Int. Cl.² .................... C08K 5/52; C08L 71/04
[52] U.S. Cl. .................. 260/45.7 P; 260/45.8 R;
525/68
[58] Field of Search .............. 260/45.7 P, 45.8 R;
525/68

[56] References Cited

U.S. PATENT DOCUMENTS

| | | | |
|---|---|---|---|
| 3,943,191 | 3/1976 | Cooper et al. | 260/45.7 P |
| 3,952,072 | 4/1976 | Yonemitsu et al. | 260/45.7 P |
| 3,956,423 | 5/1976 | Katchman | 525/68 |
| 3,966,849 | 6/1976 | Noetzel et al. | 260/937 |
| 3,981,841 | 9/1976 | Abolins et al. | 260/45.7 P |

Primary Examiner—Carman J. Seccuro
Attorney, Agent, or Firm—Bruce F. Jacobs

[57] ABSTRACT

Flame retardant rubber-modified polyphenylene-ether resins compositions having improved thermal stability are prepared by using a 2,5,5-trisubstituted 1,3,2-dioxaphosphorinane-2-oxide of the formula:

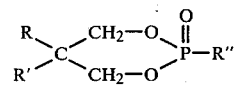

10 Claims, No Drawings

FLAME-RETARDANT, POLYPHENYLENE-ETHER RESIN COMPOSITIONS CONTAINING A 2,5,5-TRISUBSTITUTED 1,3,2-DIOXAPHOSPHORINANE-2-OXIDE

The present invention relates to flame-retardant, polyphenylene-ether resin compositions containing a neopentylenephosphonate compound. More particularly, the invention relates to rubber-modified, polyphenylene-ether resin compositions containing an effective flame-retarding amount of 2,5,5-trisubstituted-1,3,2-dioxaphosphorinane-2-oxide compound represented by the formula (I):

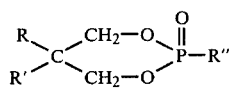  (I)

wherein R and R' are methyl or ethyl, and R" is selected from alkyl with 1–4 carbon atoms, phenyl and benzyl each containing up to 3 methyl groups. Some compounds represented by the above formula wherein R and R' are methyl have been reported in the literature. U.S. Pat. No. 3,966,849 discloses the utility of compounds wherein R" was halogen-containing linear, branched chain or cyclic aliphatic hydrocarbon radical as flame retardants in polystyrene or a styrene copolymer. U.S. Published Application No. B512,373, discloses compounds wherein R" is a hydroxybenzyl radical as thermal and light stabilizers for organic materials, including polymers.

In a previous application of the present inventor, U.S. Ser. No. 900,827, filed Apr. 28, 1978, now U.S. Pat. No. 4,162,278, discloses the use of compounds represented by the formula (II):

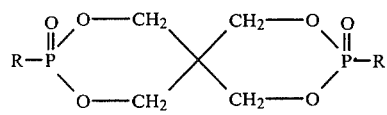  (II)

wherein R is selected from methyl, phenyl, benzyl, mono-, di-, and trimethylbenzyl, as flame-retardant compounds for rubber-modified, polyphenylene-ether resins. Although those compounds provide excellent flame retardancy to these polymers, they have been found to have a tendency to cause discoloration at the high temperatures encountered in processing the polymer, e.g., about 320° C. This, of course is a deterrent to their commercial use as flame-retardant compounds.

The present invention provides neopentylene-phosphonate compounds, represented by Formula (I), which surprisingly are both effective flame retardants for rubber-modified polyphenylene-ether resins and also provide thermal stability at the temperatures where such polymers are normally processed. Thus the present invention represents an improvement in the flame retardance of rubber-modified, polyphenylene-ether resins over that provided by the prior copending application.

The compounds may be readily prepared by known procedures by reacting an appropriate phosphonic dichloride with the appropriate 2,2-disubstituted 1,3-propane diol or by reacting the appropriate benzyl, or substituted benzyl chloride, with neopentyl phosphite, or a 5,5-disubstituted 1,3,2-dioxaphosphorinane 2-oxide, as described in the following examples.

The polyphenylene-ether resins, which are flame retarded by the 2,5,5-trisubstituted-1,3,2-dioxaphosphorinane-2-oxide compounds of the present invention, may be prepared as described in U.S. Pat. No. 4,024,093, incorporated herein by reference. In particular, the polyphenylene-ether resins for which the compounds are useful are rubber-modified, polyphenylene-ether resins comprising 10 to 90 parts by weight of polyphenylene ether, preferably 20 to 70 parts by weight, and 90 to 10 parts by weight, preferably 80 to 30 parts by weight of a rubber-modified, high-impact polystyrene. The resins are blends of the two polymers, which are mutually soluble, to form a homogeneous polymer composition.

The flame-retardant compound is used in the blended polyphenylene-ether resin in an amount sufficient to provide a self-extinguishing composition, as defined below. In general, the compound is effectively used in an amount of from about 1 to 20 percent by weight, preferably 2 to 10 percent by weight.

The flame-retardant compound may be added to the polymer by any known method, such as by milling on a two-roll plastic mill or in a Banbury mixer, by dry-blending with the polymer and extruding, and the like.

It is also within the scope of the invention to incorporate such other ingredients into the polymer as plasticizers, dyes, pigments, heat and light stabilizers, antioxidants, antistatic agents, and the like.

The following examples further illustrate the invention. All parts and percents are by weight unless otherwise specified.

EXAMPLE 1

Methyl Neopentylene Phosphonate

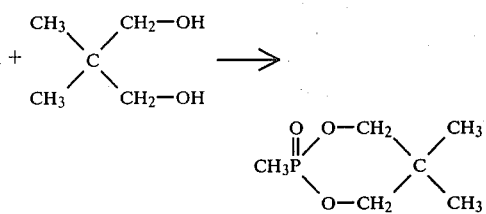

To 500 ml dioxane was added 104 g (1 M) of neopentyl glycol and 200 g (2.5 M) pyridine. A solution of 133 g (1 M) of methyl phosphonic dichloride in 100 ml dioxane was added slowly. After addition, the mixture was refluxed 2 hours, cooled and filtered to remove the pyridine hydrochloride. The filtrate was vacuum stripped to give a solid residue. This was distilled in vacuo to yield 55 g of product, bp 100°–105°/0.05 mm. which melted at 88°–100°. Further purification was accomplished by slurrying in ether, filtering, and recrystallizing from ethyl acetate to give a white crystalline solid, mp 118°–120° C.

EXAMPLE 2

Phenyl Neopentylene Phosphonate

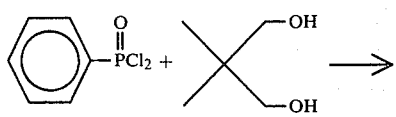

-continued

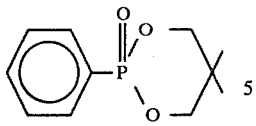

To a solution of 62.4 g (0.6 M) of neopentyl glycol and 110.6 g (1.4 M) pyridine in 500 ml dioxane was slowly added 117 g (0.6 M) of phenyl phosphonic dichloride with cooling to keep the temperature below 30° C. After addition, the mixture was stirred for 1.5 hours and filtered. The filtrate was stripped in vacuo to give an oil which solidified. This was slurried in boiling water (formed an oil) and cooled with rapid stirring. Filtration gave 60 g of white solid which was recrystallized from methylcyclohexane to give 36 g white crystals, mp 110°–112° C. Anal calc for $PO_3C_{11}H_{15}$: C, 58.5; H, 6.6; P, 13.7. Found: C, 59.39; H, 7.04; P, 13.51.

EXAMPLE 3

2,4,6-Trimethylbenzyl Neopentylene Phosphonate

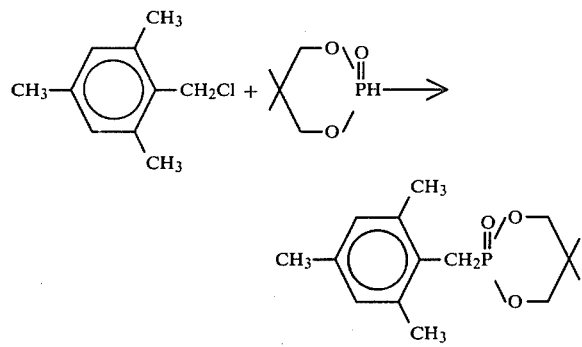

A solution of 80 g (0.533 M) neopentyl phosphite in 200 ml dry dimethylformamide (DMF) was slowly added to a slurry of 21 g of 57% sodium hydride in 200 ml dry dimethylformamide. To this was added slowly a solution of 84 g (0.5 M) alpha-chloroisodurene, then heated to 65° C. for one hour, heated for an additional 4 hours at 60° C., cooled and carefully poured into one liter of water with stirring. The product was then filtered, washed well with water, and dried in vacuo. Recrystallization from methylcyclohexane gave 92 g of white crystalline product, mp 133°–135° C. Anal calc for $PO_3C_{15}H_{23}$: C, 63.8; H, 8.3; P, 11.0. Found: C, 63.73; H, 8.26; P, 10.36.

EXAMPLE 4

Benzyl Neopentylene Phosphonate

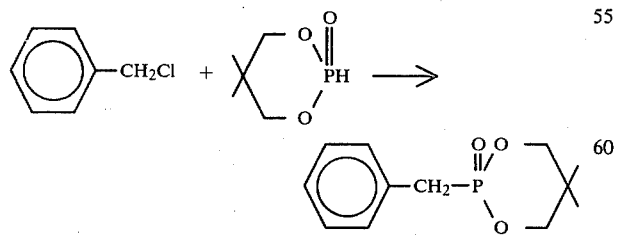

The sodium salt of neopentyl phosphite was prepared from 30.0 g (0.2 M) of neopentyl phosphite and 8.4 g (0.2 M) of 57% sodium hydride in 175 ml dry DMF. To this solution was slowly added a solution of 25.3 g (0.2 M) benzyl chloride in 50 ml dry DMF. The reaction mixture was heated for several hours at 70° C., cooled, filtered, and stripped in vacuo to give an oil that solidified. This was recrystallized from water to give white plates, mp 108°–110° C. Anal calc for $PO_3C_{12}H_{17}$: C, 60.0; H, 7.08; P, 12.92. Found: C, 59.6; H, 7.02; P, 13.04.

EXAMPLE 5

The procedure of Example 1 is repeated except the neopentyl glycol is replaced by
 (a) 2-ethyl-2-methyl-1,3-propanediol, and
 (b) 2,2-diethyl-1,3-propanediol
to produce products wherein
 (a) R is methyl and R' is ethyl, and
 (b) R and R' are both ethyl.

EXAMPLE 6

A total of 10 g of a 50/50 blend of polyphenylene ether/rubber-modified impact polystyrene containing the phosphonate flame retardant was dry blended and extruded through a melt index apparatus (described in ASTM D-1238) at 290°–300° C. The cylindrical extrudate, 3–5 inches in length and 0.25 inch in diameter, is subjected to the flammability test procedure described in Underwriters' Laboratories Test UL 94, Vertical Test Method 3.10–3.15 (September, 1973). The above polymer sample, clamped in a vertical position, is ignited with a ¾ inch blue flame (methane or natural gas) for 10 seconds, and the flame is withdrawn. If the flame is extinguished within 25 seconds, it is ignited again for 10 seconds, and the flame is withdrawn. The flame-extinguishment time is again recorded. If the flame-extinguishment time does not exceed 5 seconds for either flame application, the sample is rated V-0. If the flame-extinguishment time for either the first or second flame application is between 5 and 25 seconds, it is rated V-1. If a sample shows extinguishment time greater than 25 seconds for either flame application, it is rated "free-burning" (FB) and it is considered as failing by this test.

In addition to the above flammability test, each flame-retardant additive was subjected to a thermal stability test by heating in a glass tube at 320° C. for five minutes. Results are shown in Table I.

The data in Table I illustrate that the compounds of the invention exhibited flame-retardant activity at about 4 to 6% concentration and also passed the thermal stability test, i.e., did not discolor at 320° C. Table II illustrates that related pentaerythrityl phosphonates, although good flame retardants, discolor badly on exposure to a temperature of 320° C. for 5 minutes.

TABLE I

EVALUATION OF FLAMMABLILITY AND THERMAL STABILITY $$\begin{array}{c} CH_3 \\ \diagdown \\ \diagup \\ CH_3 \end{array} C \begin{array}{c} CH_2-O \\ \diagdown \\ \diagup \\ CH_2-O \end{array} P \begin{array}{c} O \\ \diagdown \\ \diagup \end{array} R''$$

| R'' | Flammability Rating | Color on Aging 320° C. 5 Min. |
|---|---|---|
| —CH₂—⌬ | 6% V-1<br>8% V-0 | White |

TABLE I-continued

EVALUATION OF FLAMMABLILITY AND THERMAL STABILITY $$\begin{array}{c} CH_3 \\ \diagdown \\ CH_3 \end{array} C \begin{array}{c} CH_2-O \\ \diagup \\ CH_2-O \end{array} \begin{array}{c} O \\ \| \\ P-R'' \end{array}$$

| R'' | Flammability Rating | Color on Aging 320° C. 5 Min. |
|---|---|---|
| —⟨phenyl⟩ | 6% V-0<br>8% V-0 | White |
| —CH₂—⟨2,4,6-trimethylphenyl⟩ | 4% V-1<br>6% V-1<br>8% V-0 | Sl Yellow |
| CH₃— | 4% V-1<br>6% V-0<br>8% V-0 | Off-White[a] |

[a]Thermal aging is carried out in a closed tube

TABLE II $$\begin{array}{c} O \\ \| \\ RP \end{array} \begin{array}{c} O-CH_2 \\ \diagdown \\ O-CH_2 \end{array} C \begin{array}{c} CH_2-O \\ \diagup \\ CH_2-O \end{array} \begin{array}{c} O \\ \| \\ PR \end{array}$$

| R | Color on Aging 320° C., 5 Min. |
|---|---|
| —CH₃ | Black |
| —CH₂—⟨phenyl⟩ | Dark Brown |
| —⟨phenyl⟩ | Grey |
| —CH₂—⟨2,4,6-trimethylphenyl⟩ | Yellow |

EXAMPLE 7

Phenyl neopentylene phosphonate, benzyl neopentylene phosphonate, and methyl neopentylene phosphonate were evaluated as flame retardants for a commercially available rubber-modified, high-impact polystyrene at a concentration of 20% using the procedure of Example 6. All of the samples failed the flammability test and were rated "free-burning" (FB).

EXAMPLE 8

Methyl neopentylene phosphonate was dry blended with a commercially available high-impact polystyrene (Cosden 825 TV) and extruded, as described, at 250° C. The flammability was determined as described in Example 6. Results were as shown in Table III.

TABLE III
FLAMMABILITY OF METHYL NEOPENTYL PHOSPHONATE IN IMPACT POLYSTYRENE

| Concentration % | Burning Time, sec. | | Rating |
|---|---|---|---|
| | 1st Ignition | 2nd Ignition | |
| 10 | 45 (drips) | 5 (drips) | FB |
| 10* | 40 (drips) | 25 (drips) | FB |
| 20 | 30 (drips) | 2 (drips) | FB |
| 20* | 20 (drips) | 55 (drips) | FB |

*duplicate test

The data in Table III illustrate that methyl neopentyl phosphonate does not retard the flammability of impact polystyrene at a concentration up to 20% by weight.

EXAMPLE 9

The procedure of Example 6 was repeated except that a 70/30 blend of polyphenylene-ether/rubber-modified, impact polystyrene was used instead of a 50/50 blend. Methyl neopentyl phosphonate was incorporated therein at a level of 1% and 2% by weight. Flammability results are shown in Table IV.

TABLE IV

| Concentration % | Burning Time, sec. | | Rating |
|---|---|---|---|
| | 1st Ignition | 2nd Ignition | |
| 1 | 5 | 11 | V-1 |
| 2 | 5 | 4 | V-0 |

The data illustrate that methyl neopentyl phosphonate is an excellent flame retardant for a polyphenylene-ether/rubber-modified, impact polystyrene polymer at very low concentrations.

I claim:

1. A flame-retardant, polyphenylene-ether resin/rubber-modified, high-impact polystyrene thermoplastic composition comprising an effective flame-retarding amount of a 2,5,5-trisubstituted-1,3,2-dioxaphosphorinane-2-oxide compound represented by the formula:

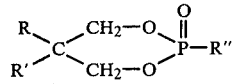

wherein R and R' are methyl or ethyl, and R'' is selected from alkyl of 1-4 carbon atoms, phenyl, phenyl having 1-3 methyl groups, benzyl, and benzyl having 1-3 methyl groups.

2. The composition of claim 1 wherein said thermoplastic composition comprises a homogeneous blend of 20 to 70 percent polyphenylene-ether resin and 30 to 80 percent of rubber-modified, high-impact polystyrene.

3. The composition of claim 1 wherein R and R' are the same.

4. The composition of claim 1 wherein R and R' are different.

5. The composition of claims 3 or 4 wherein R'' is methyl.

6. The composition of claims 3 or 4 wherein R'' is phenyl.

7. The composition of claims 3 or 4 wherein R'' is benzyl.

8. The composition of claims 3 or 4 wherein R'' is 2,4,6-trimethylbenzyl.

9. The composition of claim 1 wherein the phosphonate compound is present in at least about 1% by weight of the composition.

10. The compound 2,4,6-trimethylbenzyl neopentylene phosphonate.

* * * * *